(12) United States Patent
Li et al.

(10) Patent No.: US 12,267,834 B2
(45) Date of Patent: Apr. 1, 2025

(54) USER EQUIPMENT, SCHEDULING NODE, METHOD FOR USER EQUIPMENT, AND METHOD FOR SCHEDULING NODE

(71) Applicant: Panasonic Intellectual Property Corporation of America, Torrance, CA (US)

(72) Inventors: Hongchao Li, Langen (DE); Hidetoshi Suzuki, Kanagawa (JP); Quan Kuang, Langen (DE); Tiong Hou Teo, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 247 days.

(21) Appl. No.: 17/762,328

(22) PCT Filed: Oct. 7, 2020

(86) PCT No.: PCT/EP2020/078088
§ 371 (c)(1),
(2) Date: Mar. 21, 2022

(87) PCT Pub. No.: WO2021/094037
PCT Pub. Date: May 20, 2021

(65) Prior Publication Data
US 2022/0279557 A1    Sep. 1, 2022

(30) Foreign Application Priority Data

Nov. 15, 2019  (EP) .................................... 19209581

(51) Int. Cl.
*H04W 72/1273*  (2023.01)
*H04W 72/044*   (2023.01)
(Continued)

(52) U.S. Cl.
CPC ..... *H04W 72/1273* (2013.01); *H04W 72/044* (2013.01); *H04W 72/20* (2023.01); *H04W 72/569* (2023.01)

(58) Field of Classification Search
CPC .......... H04W 72/1273; H04W 72/044; H04W 72/20; H04W 72/569; H04W 52/0206;
(Continued)

(56) References Cited

U.S. PATENT DOCUMENTS

2012/0294213 A1   11/2012 Chen et al.
2019/0104554 A1   4/2019  Amuru et al.
(Continued)

FOREIGN PATENT DOCUMENTS

| CN | 103875187 A | 6/2014 |
|----|-------------|--------|
| CN | 109691186 A | 4/2019 |

(Continued)

OTHER PUBLICATIONS

3GPP, "3rd Generation Partnership Project; Technical Specification Group Radio Access Network; Study on Scenarios and Requirements for Next Generation Access Technologies; (Release 15), " 3GPP TR 38.913 V15.0.0, Jun. 2018 (39 pages).

(Continued)

*Primary Examiner* — Mohamed A Kamara
(74) *Attorney, Agent, or Firm* — Seed IP Law Group LLP

(57) ABSTRACT

The disclosure relates to a communication device, a base station and respective methods for a communication device and a base station. More specifically, the base station transmits (S930) and the communication device receives (S1030) downlink control information, DCI, signaling. The DCI signaling includes (S1040) an indication that is related to the dormancy behavior of a secondary cell, Scell. The Scell is configured with a plurality of bandwidth parts, BWPs, and the plurality of BWPs includes a dormant BWP and one or (Continued)

more normal BWPs. If the indication indicates transitioning from dormancy behavior to non-dormancy behavior, a target BWP for performing non-dormancy behavior is determined (S1060). The determination of the target BWP is performed, in particular, in accordance with at least one of: a priority order of the one or more normal BWPs, a predefined or preconfigured BWP, a legacy BWP indicator field in the DCI signaling, a most recently active normal BWP, and the dormant BWP.

15 Claims, 5 Drawing Sheets

(51) Int. Cl.
  *H04W 72/20* (2023.01)
  *H04W 72/566* (2023.01)
(58) Field of Classification Search
  CPC . H04W 76/28; H04W 72/0453; H04W 72/23; H04L 5/0098; H04L 5/001
  See application file for complete search history.

(56) References Cited

U.S. PATENT DOCUMENTS

| | | | |
|---|---|---|---|
| 2019/0124558 A1 | 4/2019 | Ang et al. | |
| 2019/0132109 A1 | 5/2019 | Zhou et al. | |
| 2019/0261425 A1* | 8/2019 | Park | H04W 76/27 |
| 2019/0297577 A1 | 9/2019 | Lin et al. | |
| 2019/0342907 A1 | 11/2019 | Huang et al. | |
| 2020/0092864 A1* | 3/2020 | Chen | H04W 36/06 |
| 2020/0314885 A1* | 10/2020 | Cirik | H04L 5/0048 |
| 2021/0143967 A1* | 5/2021 | Awad | H04L 5/0098 |
| 2023/0112209 A1* | 4/2023 | Ang | H04W 16/08 370/311 |

FOREIGN PATENT DOCUMENTS

| | | |
|---|---|---|
| RU | 2515553 C2 | 5/2014 |
| WO | 2019/084570 A1 | 5/2019 |

OTHER PUBLICATIONS

International Telecommunication Union (ITU), "IMT Vision—Framework and overall objectives of the future development of IMT for 2020 and beyond," Radiocommunication Sector of the ITU (ITU-R), M.2083-0, Geneva, Sep. 2015. (21 pages).
Russian Office Action dated Jan. 19, 2024, for the corresponding Russian Patent Application No. 2022102462/07(005280), 24 pages. (With English Translation).
3GPP, "3rd Generation Partnership Project; Technical Specification Group Radio Access Network; NR; Multiplexing and channel coding (Release 15)," 3GPP TS 38.212 V15.7.0, Sep. 2019 (101 pages).
3GPP, "3rd Generation Partnership Project; Technical Specification Group Radio Access Network; NR; NR and NG-RAN Overall Description; Stage 2 (Release 15)," 3GPP TS 38.300 V15.7.0, Sep. 2019 (99 pages).
3GPP, "3rd Generation Partnership Project; Technical Specification Group Radio Access Network; NR; Multiplexing and channel coding (Release 15)," 3GPP TS 38.212 V15.6.0, Jun. 2019 (101 pages).
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019 (99 pages).
3GPP, "3rd Generation Partnership Project; Technical Specification Group Radio Access Network; NR; Physical channels and modulation (Release 15)," 3GPP TS 38.211 V15.0.0, Dec. 2017 (74 pages).
3GPP, "3rd Generation Partnership Project; Technical Specification Group Radio Access Network; NR; Physical channels and modulation (Release 15)," 3GPP TS 38.211 V15.7.0, Sep. 2019 (97 pages).
3GPP, "3rd Generation Partnership Project; Technical Specification Group Services and System Aspects; System Architecture for the 5G System; Stage 2 (Release 16)," 3GPP TS 23.501 V16.1.0, Jun. 2019 (368 pages).
Extended European Search Report, dated May 20, 2020, for European Application No. 19209581.8 (12 pages).
International Search Report, mailed Nov. 10, 2020, for International Application No. PCT/EP2020/078088 (7 pages).
LG Electronics, "Discussion on L1 based Scell dormancy," R1-1910838, Agenda Item: 7.2.13.3, 3GPP TSG RAN WG1 Meeting #98bis, Chongging, China, Oct. 14-20, 2019 (8 pages).
Panasonic, "On L1 dormancy-like behavior indication," R1-1913052, Agenda Item: 7.2.13.3, 3GPP TSG RAN WG1 #99, Reno, USA, Nov. 18-22, 2019 (4 pages).
Qualcomm Incorporated, "Fast SCell Activation and SCell Dormancy," R1-1911139, Agenda Item: 7.2.13.3, 3GPP TSG-RAN WG1 #98bis, Chongging, China, Oct. 14-20, 2019 (18 pages).
ZTE Corporation, Sanechips, "On SCell dormancy behavior," R2-1914822, Agenda Item: 6.10.4.2, 3GPP TSG-RAN WG2 Meeting #108, Reno, USA, Nov. 18-22, 2019 (4 pages).
Ericsson, "Reduced latency Scell management for NR CA," R1-1912786, 3GPP TSG RAN WG1 #99, Reno, USA, Nov. 18-22, 2019. (6 pages).
Notice of Reasons for Rejection, dated Aug. 27, 2024, for Japanese Patent Application No. 2022-527212. (5 pages) (with English translation).
Office Action, dated Jan. 16, 2025, for Chinese Patent Application No. 202080071837.9. (14 pages) (With English Translation).

\* cited by examiner

USER EQUIPMENT, SCHEDULING NODE, METHOD FOR USER EQUIPMENT, AND METHOD FOR SCHEDULING NODE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitating efficient operation of the communication system as well as particular devices pertaining to the system.

SUMMARY

One non-limiting and exemplary embodiment facilitates providing efficient determination of a BWP for performing non-dormancy like behavior in a wireless communication system.

In an embodiment, the techniques disclosed here feature an apparatus (e.g., a user equipment, UE). The apparatus comprises a transceiver that, in operation, receives downlink control information, DCI, signaling. The apparatus further comprises a circuitry that, in operation, obtains, from the DCI signaling, an indication that is related to dormancy behavior of a secondary cell, Scell, wherein the Scell is configured with a plurality of bandwidth parts, BWPs, the plurality of BWPs including a dormant BWP and one or more normal BWPs; and, if the indication indicates transitioning from dormancy behavior to non-dormancy behavior, determines a target BWP for performing non-dormancy behavior. The determination of the target BWP is performed, in particular, in accordance with at least one of: a priority order of the one or more normal BWPs, a predefined or preconfigured BWP, a legacy BWP indicator field in the DCI signaling, a most recently active normal BWP, and the dormant BWP.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
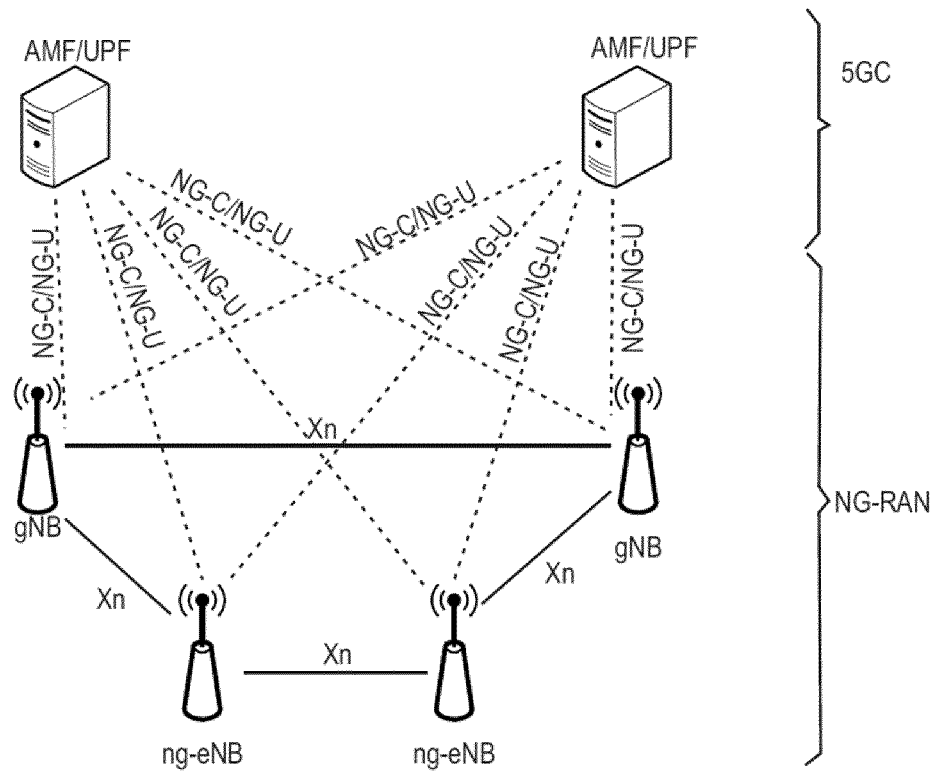
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface, The NG-RAN architecture is illustrated in FIG. 1 (see, e.g., 3GPP TS 38.300 v15.6.0, section 4).

The user plane protocol stack for NR (see, e.g., 3GPP IS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP IS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in subclause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1$-$10^{-5}$ within 1 ms). Finally, mMTC may preferably require high connection density (1,000,000 devices/km² in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.7.0).

Comparing to LTE numerology (subcarrier spacing and symbol length), NR supports multiple different types of subcarrier spacing, labeled by a parameter $\mu$ (in LTE there is only a 15 kHz subcarrier spacing, corresponding to $\mu=0$ in NR). The types NR numerology is summarized in 3GPP TS 38.211, v 15.7.0.

5G NR Functional Split Between NG-RAN and 5GC

Figure 2:
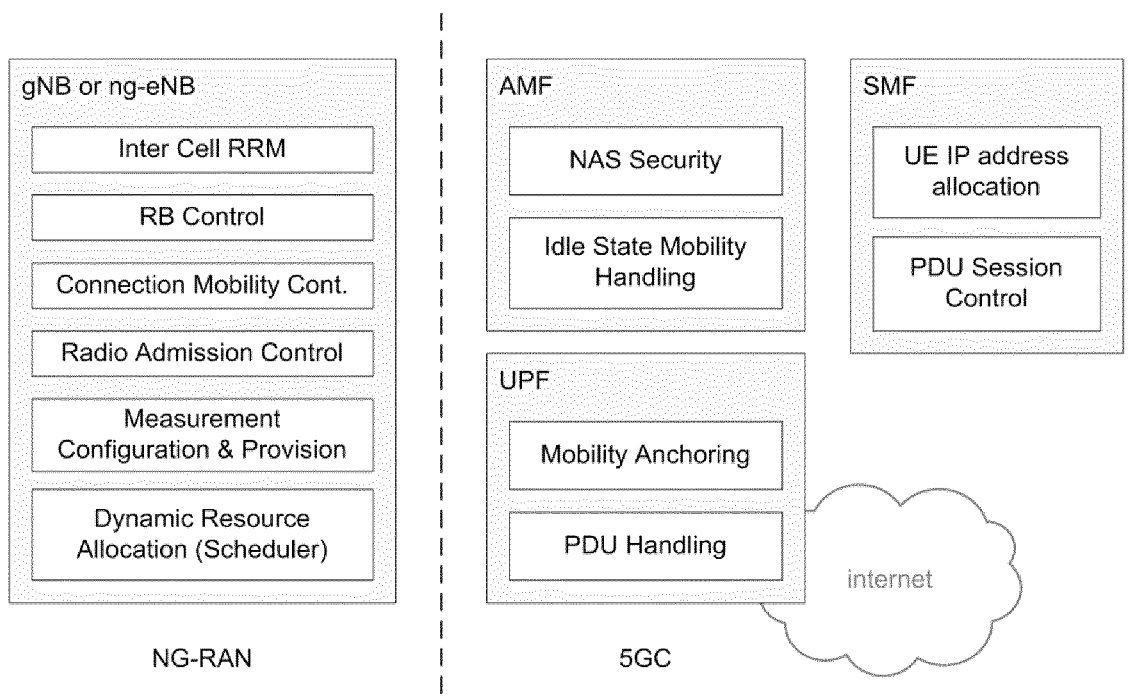
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signaling termination;

NAS signaling security;

Access Stratum, AS, Security control;

Inter Core Network, CN, node signaling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:
Session Management;
UE IP address allocation and management,
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
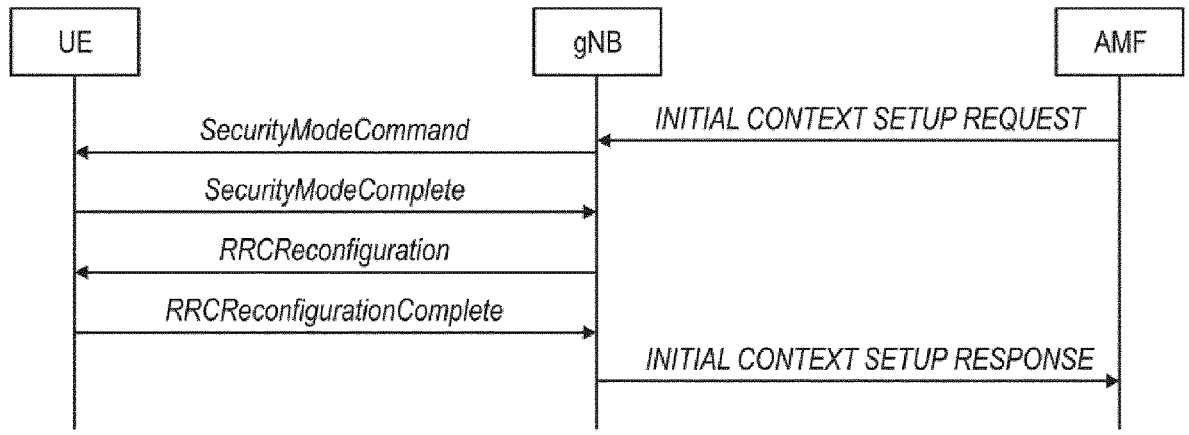
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
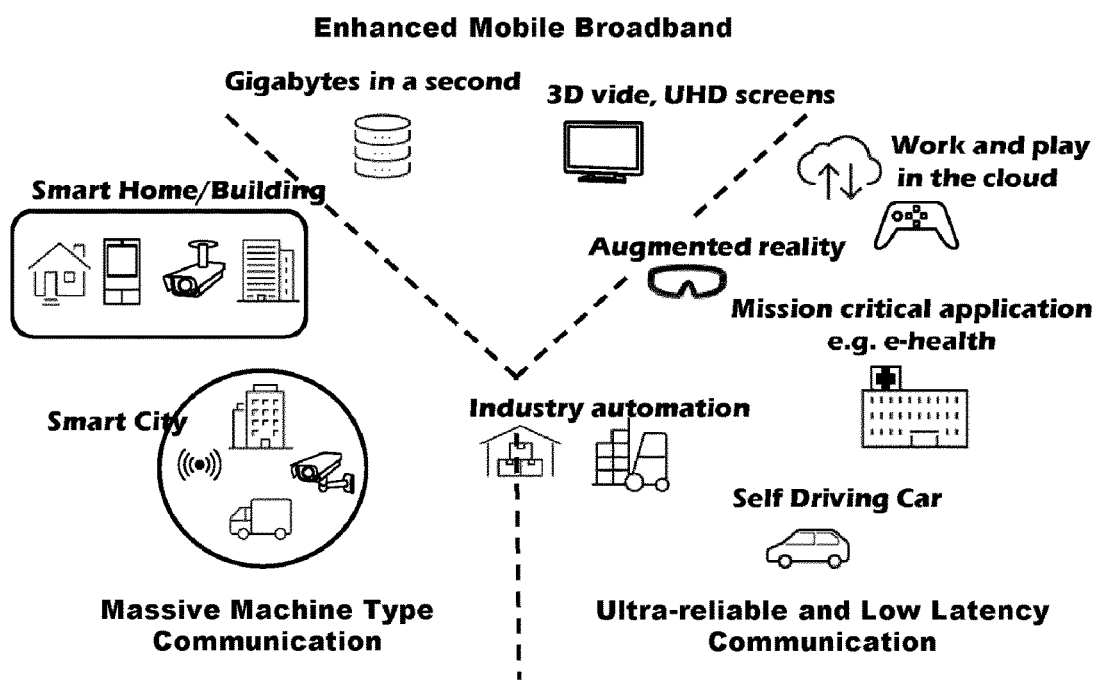
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
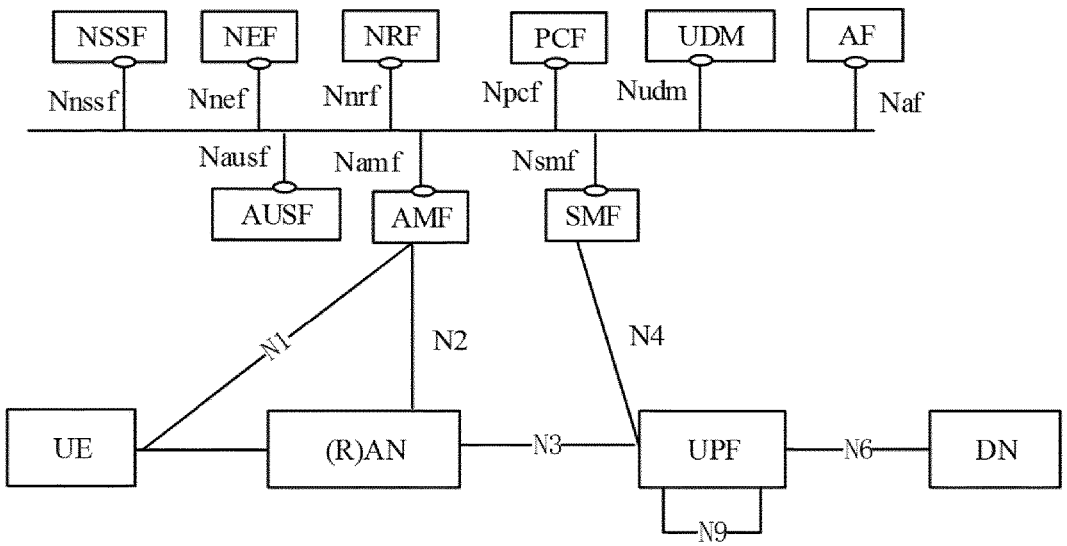
FIG. 5 is a block diagram showing an exemplary 5G system architecture for a non-roaming.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Terminal and Base Station

A terminal or user terminal, or user device is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node or scheduling node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Since the present disclosure relates to scheduling, both entities, a scheduled device (typically communication device/transceiver device) and scheduling device (typically network, node) take part. The present disclosure further provides a system including a scheduled and scheduling device, as well as a corresponding methods and programs.

In the following, UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate, Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Downlink Control Channel Monitoring, PDCCH, DCI

Many of the functions operated by the UE involve the monitoring of a downlink control channel (e.g., the PDCCH, see 3GPP TS 38.300 v15.6.0, section 5.2.3) to receive, e.g., particular control information or data destined to the UE.

A non-exhaustive list of these functions is given in the following:

a paging message monitoring function,
a system information acquisition function,
signaling monitoring operation for a Discontinued Reception, DRX, function,
inactivity monitoring operation for a Discontinued Reception, DRX, function,
random access response reception for a random access function,
reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Physical Resource Block

In general, the term "physical resource block" (PRB) refers to the smallest allocable resource unit usable for (user) data transmission. In LTE and NR, a PRB has a predetermined number (e.g., 12) of consecutive subcarriers in frequency domain and a predetermined number of symbols in time domain e.g., 14 OFDM symbols in LTE).

Cell Types—Primary Cell, Secondary Cell, Serving Cell

The term "cell" refers to a component carrier (CC) on which the allocable resources (such as time-frequency-space resources) are located. There may be more carriers used by a terminal, e.g., to increase the number of available resources. These CCs may be referred to as cells.

The primary cell (Pcell) operates on the primary frequency, which is the frequency on which the UE performs the initial connection establishment procedure, and/or initiates the connection re-establishment procedure. The Pcell may be the cell indicated explicitly in a handover procedure.

A secondary cell (Scell), operating on a secondary frequency, which may be configured once an RRC connection is established and which may be used to provide additional radio resources.

For a UE in RRC_CONNECTED not configured with carrier aggregation (CA) there is only one serving cell, which is the primary cell. For a UE in RRC_CONVICTED configured with CA, the term "serving cells" denotes the primary cell and all secondary cells. In other words, a serving cell is a cell through which a UE is configured to transmit and/or receives data.

Bandwidth Parts (BWPs)

In general, for each cell (e.g., serving cell), a plurality of BWPs may be configured (e.g., by RRC signaling).

In NR, a BWP consists of a group of contiguous PRBs. The bandwidth (BW) of a BWP cannot exceed the configured component carrier (CC) BW for the UE, and must be at least as large as one synchronization signal (SS) block BW, but the BWP may or may not contain a SS block. Each BWP is associated with a specific numerology, i.e., subcarrier spacing (SCS) and cyclic prefix (CP) type. Therefore, the BWP is also a means to reconfigure a UE with a certain numerology. For each cell, multiple BWPs may be configured to a UE via Radio Resource Control (RRC) signaling, which may overlap in frequency. The granularity of BW configuration is one PRB. For each serving cell, DL and UL BWPs are configured separately and independently for paired spectrum, and up to four BWPs can be configured for each of DL and UL. For unpaired spectrum, a DL BWP and a UL BWP are jointly configured as a pair, and up to 4 pairs can be configured. There can be maximally 4 UL BWPs configured for a supplemental UL (SUL) as well. Each configured DL BWP includes at least one control resource set (CORESET) with UE-specific search space (USS). The USS is a searching space for UE to monitor possible reception of control information destined for the UE (e.g., specific PDCCH carrying the DCI(s)).

Similarly to the search space is a set of candidate resources which a UE monitors PDCCH. The monitoring includes, e.g., blind detection and decoding of the PDCCH in the candidate resources. PDCCH addressed to a UE are provided, e.g., by a cyclic redundancy check (CRC) mask depending on a UE identity. For instance, in LTE or NR, the UE identity may be a temporal identity assigned to the UE by network, such as Radio Network Temporary Identifier, RNTI. The RNTI may be used to scramble the CRC. If the candidate resources carry PDCCH addressed to the UE, then the UE will be able to identify the PDCCH is addressed to this UE and decode the DCI successfully, meaning that the CRC does not fail.

In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap. The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

It is further defined in the specification that a UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time. The UE shall not transmit PUSCH or PUCCH outside an active bandwidth part. A numerology is defined by subcarrier spacing and cyclic prefix (CP). A resource block (RB) is generally defined as 12 consecutive subcarriers in the frequency domain. Physical resource blocks (PRB) are numbered within a BWP, the PRB numbering of for the BWP starting from 0.

The size of a BWP can vary from a minimum of 1 PRB to the maximum size of system bandwidth. Currently, up to four BWPs can be configured by higher layer parameters for each DL (downlink) and UL (uplink), with a single active downlink and uplink BWP in a given TTI (transmission time interval). However, the disclosure is not limited to the case defined in TS 38.211 of a UE being configured with up to four bandwidth parts. The number of bandwidth parts may be greater than 4 in the uplink and/or downlink. For example, a UE may be configured with 8 BWPs.

TTI (Transmission Time Interval) determines the timing granularity for scheduling assignment. One TTI is the time interval in which given signals is mapped to the physical layer. The TTI length can vary from 14-symbols (slot-based scheduling) to up to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017-12). However, transmission may also be non-slot based. In non slot-based communication, the minimum length of a TTI may be 2 OFDM symbols. The BWP concept in NR is to allow the dynamic configuration of a relatively small active bandwidth for smaller data packets, which allows power saving for the UE because for a small active BWP the UE needs to monitor less frequencies or use less frequencies for transmission.

Activation/Deactivation of BWPs

At a given time, (only) one of the configured BWPs of a cell may be active, which is also referred to as the (currently) active BWP of said cell. It is noted that, in the present disclosure, the term "currently active" BWP refers to that BWP that is active when the DCI that includes the dormancy switching indication (explained below) is received. In other words, the currently active BWP may be that BWP that is active when the target BWP is determined and/or when a priority of BWPs is determined (also explained below).

If a cell has an active BWP, said cell is also referred to as an active/activated cell. In general, one or more cell may be active at the same time. For instance, a UE may have an active Pcell and one or more active Scell(s). In general, a UE is not expected to receive PDSCH, PDCCH, CSI-RS, or TRS outside an active BWP. Thus, a UE does not report CSI for a BWP that is not active.

More specifically, for each cell, the active bandwidth part for a user equipment (e.g., the bandwidth part to be used by a UE for transmission and reception of signals in a TTI), can be switched among the configured BWPs. For instance, depending on current needs, the active BWP may be switched to a larger BWP, or, in order to save battery power for the UE, to a smaller BWP. This is possible by dynamical indication in the DCI of the active BWP to be used in the next TTI. A DCI transports downlink and uplink scheduling information (e.g., resource assignments and/or grants), requests for aperiodic CQI reports, or uplink power control commands for one cell and one RNTI. DCI coding includes information element multiplexing, CRC (Cyclic Redundancy Check) attachment, channel coding, and rate matching. A DCI carries transmission parameters such as MCS, redundancy version or HARQ process number. A DCI consists of several field (e.g., bit fields/bitmaps) carrying different types of control information or control parameters. The location of a certain parameter, and the number of bits coding the respective parameter are known to the base station transmitting the DCI and the UE receiving the DCI. However, such switching of the active BWP adds to the latency because the UE needs to decode the DCI and then start hardware tuning to the new active BWP.

In NR, a BWP may be activated/deactivated via dedicated RRC signaling or DCI signaling. Although more prompt than an activation/deactivation based on MAC control elements (CEs), the DCI based mechanism requires additional consideration for error case handling, i.e., for the case that a UE fails to decode the DCI containing the BWP activation/deactivation command. To help to recover from such a DCI lost case, the activation/deactivation of a DL BWP (or DL/UL BWP pair for the case of unpaired spectrum) by means of timer is also supported. With this mechanism, if a UE is not scheduled for a certain amount of time, i.e., expiration of timer, the UE switches its active DL BWP (or DL/UL BWP pair) to the default BWP. There is an initially active BWP for a UE during the initial access until the UE is explicitly configured with BWPs during or after RRC connection establishment. Unless configured otherwise, the initial active BWP is the default BWP. In Release 15, for a UE, there is at most one active DL BWP and at most one active UL BWP (for each cell). The HARQ retransmission across different BWPs is supported when a UE's active BWP is switched. However, the present disclosure is not limited thereto. In general, for each cell, there may be more than one activated BWP.

Dormancy/Non-Dormancy Behavior

Dormancy-like and non-dormancy-like behavior are defined in 3GPP RAN1 in support of UE power saving and efficient and low latency serving cell configuration/activation/setup. It is noted that, in the present disclosure, the terms "dormancy behavior" and "dormancy-like behavior" are used interchangeably. Likewise, the terms "non-dormancy behavior" and "non-dormancy-like behavior" are used interchangeably.

More specifically, dormancy-like behavior is that, in an activated Scell, UE does not monitor PDCCH but only reports periodic CSI as per configured. Non-dormancy-like behavior is that, in an activated Scell, UE needs to monitor PDCCH and also report periodic CSI. In general, a UE may perform dormancy-like behavior in one (activated) Scell and perform non-dormancy like behavior in another (activated) Scell. Said UE may then report periodically CSI for both Scells (for any of the BWPs configured for the Scells), but only monitors the PDCCH in the activated BWPs of the Scell for which the non-dormancy behavior is performed.

The configured BWPs of a cell may include normal BWP(s), which may be the configured BWPs except the dormant BWP(s), as well as said dormant BWP(s). In other words, in general, one or more of the configured BWPs may be dormant BWP(s), and one or more of the BWP(s) may be normal BWP(s). Here, a dormant BWP is a BWP for which the UE can perform dormancy-like behavior.

More specifically, when a UE performs dormancy-like behavior for a cell, only a dormant BWP of the BWPs that are configured for said cell may be active, and the normal BWP(s) cannot be active. Thus, since the UE performs the dormancy-like behavior for the active dormant BWP, the UE does not monitor the PDCCH in the dormant BWP. Since the other configured BWPs are not active, the UE does also not monitor the PDCCH in said other BWPs. In other words, the does not monitor PDCCH in a cell for which it performs dormancy-like behavior. However, the UE may still report CSI for the active dormant BWP of the dormant cell.

When, on the other hand, a UE performs non-dormancy-like behavior for an (activated) cell, any of the BWP configured for said cell may be activate, and the non-dormancy-like behavior is performed for the active BWP. In other words, when non-dormancy-like behavior is performed for a cell, the UE may monitor the PDCCH in the active BWP, which may be any of the configured BWPs (dormant or normal) as well as report CSI for said active BWP.

In general, for each cell, there may be a single dormant BWP configured. However, the present disclosure is not limited thereto. In general, for each cell, there may also be may one or more dormant BWP(s) configured. In particular, one cell may have only one (a single) configured dormant BWP, whereas another cell may have more than one dormant BWPs configured. At the same time, there may also be cells for which zero dormant BWPs are configured.

Switching Between Dormancy and Non-dormancy Behavior

An L1 (physical layer) based Scell dormancy indication (e.g., via DCI) may be sent on primary cell within active time. More specifically, the explicit information field in the DCI indicates switching to/from dormant BWP configured for the Scell. For instance, the PDCCH may schedule data for primary cell (Pcell) and also indicate dormancy for one or more Scell(s). However, the PDCCH may also indicate dormancy for one or more Scell(s) without scheduling data. It may also be indicated (e.g., by DCI) to an UE whether or not the PDCCH with dormancy indication schedules data for the Pcell. In general, the BWP framework may be used for behavior indication.

For a certain Scell, the dormancy BWP can be a relatively narrower BWP than other configured BWPs for UE to perform dormancy behavior. This allows UE to save more power. When traffic arrives, UE can be switched to other BWPs as per needed for small packet traffic or larger packet traffic for higher throughput. On the other hand, the dormancy BWP can also be a relatively wider BWP than other configured BWPs. This can be tradeoff for UE to save power and prepare for high throughput traffic by only measuring/reporting CSI but without monitoring PDCCH. When traffic arrives with large data packet and high throughput and latency requirement, UE can be swiftly switched to another wide BWP to start data transmission by using previous wideband CSI report.

For instance, for each Scell or Scell group, the dormancy indication may be a one-bit field (e.g., a flag) in DCI. The flag may then be set, by the network node, to "0" and "1" in order to indicate dormancy and non-dormancy behavior, respectively (or vice versa). In other words, each value of the bit field may be associated with, and thus indicate, a different one of dormancy and non-dormancy behavior. Alternatively for instance, the flag may also be used as a toggle flag. One of its values, e.g., "1," may then indicate switching the dormancy behavior, and the other value, e.g., "0" may be used to indicate not switching the dormancy behavior.

In general, a UE may receive, e.g., via DCI, an indication related to dormancy and/or non-dormancy behavior, which is here referred to as "dormancy indication," "Scell dormancy indication," or the like. Said dormancy indication, which may be related to/associate with the dormancy behavior of one or more (active) cells (e.g., a single cell, or a corresponding group of cells), may indicate to switch/transition, in the related cell, from dormancy to non-dormancy behavior or to switch from non-dormancy to dormancy behavior. In general, a dormancy indication may also indicate no switch/change of dormancy behavior in the activated cells. A dormancy indication that indicates a change/switch of the dormancy behavior for one or more cells is here also referred to as a "dormancy switching indication".

As just mentioned, the dormancy indication relates to the dormancy behavior of one or more cells. This cell or cell-group may, for instance, be configured/indicated by RRC. In other words, before receiving a DCI including a dormancy indication, a UE may receive an indication via RRC that indicates a cell or group of cells to which one or more dormancy indications apply. For instance, there may be a cell group of one or more cells that can be configured and reconfigured by RRC, and each dormancy indication may be related to the cell group that is configured when the DCI comprising the respective dormancy indication is received. Alternatively, it may be defined or configured that the dormancy indication is for all the Scells configured with dormancy and non-dormancy like behavior-switching.

In general, the Scell dormancy indication may be received in the DCI of the Pcell. However, the present disclosure is not limited thereto, and dormancy indication may, for instance, be received in the DCI of an Scell. In other words, in general the dormancy indication may be received in the DCI of any cell of the serving cell(s) of an UE.

In general, if a UE receives an indication to switch its dormancy behavior in a cell, it may change its active BWP of said cell, which is here also referred to as the target BWP. In other words, the target BWP is that BWP of a cell that is active after the UE has performed a transition indicated by a dormancy indication. In other words, after receiving an indication to change its dormancy behavior, the UE will perform the indicated dormancy behavior in the target BWP. In yet other words, when performing the transition of dormancy behavior as indicated by the dormancy indication, the target BWP becomes the active BWP. In general, the target BWP may be different than the currently active BWP (e.g., the BWP that is active when the dormancy indication is received) or may be the currently active BWP. It is further noted that, if a dormancy indication is related to more than one cell, for each of said cells, there may be a respective target BWP. In particular, if a UE receives an indication to switch from dormancy to non-dormancy, after an UE switches to the target BWP, the UE shall perform non-dormancy-like behavior (PDCCH monitoring and CSI report) in said target BWP.

For instance, assume that one dormant BWP and multiple normal BWPs are configured for a Scell. Then, if per cell or cell-group, the L1 signaling (dormancy indication) indicates transitioning from non-dormancy to dormancy, the UE behavior is clear, i.e., the active BWP shall switch to the dormant BWP. In other words, the dormant BWP is the target BWP, the dormant BWP becomes the active BWP, and the UE performs the dormancy-like behavior in the dormant BWP.

However, if the L1 signaling indicates transitioning from dormancy to non-dormancy behavior, the dormant BWP or any of the multiple normal BWPs may be the target BWP for performing the non-dormancy-like behavior. In other words, the UE behavior on switching to which target BWP may have to be defined.

However, in particular in the case that the DCI comprising said L1 signaling also schedules data, the L1 dormancy indication bits number may be limited. For instance, in NR, the upper bound (also denoted as X2) of the bit number for the dormancy indication inside active time may be 5 (X2=5).

In order to resolve these issues, the present disclosure provides various embodiments, which facilitate determination of target BWP(s) without requiring an explicit signaling via DCI.

Figure 6:
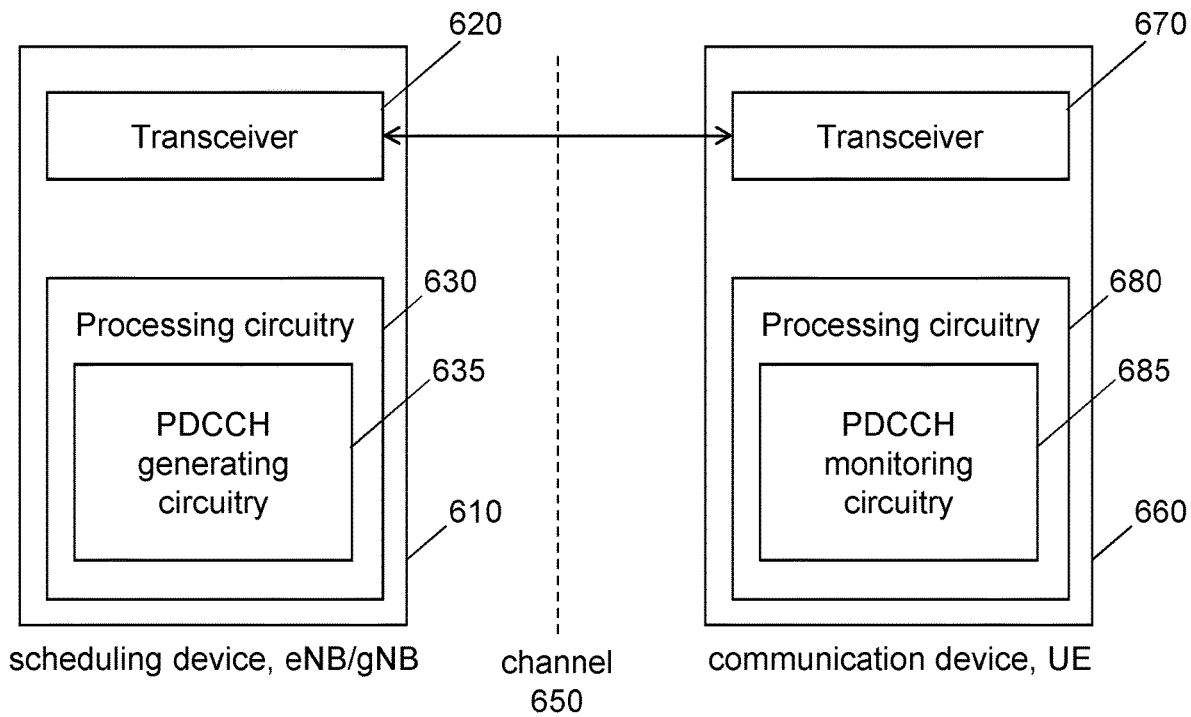
FIG. 6 is a block diagram illustrating an exemplary functional structure of a network nod and a user equipment.

An exemplary user equipment, UE, according to an embodiment is illustrated on the right-hand side of FIG. 6. According to the embodiment, the UE 660 is provided. The UE comprises a transceiver 670 that, in operation, receives (e.g., on a primary cell (Pcell)) downlink control information, DCI, signaling. The UE further comprises a circuitry 680 that, in operation, obtains from the DCI signaling an indication that is related to the dormancy behavior of a secondary cell, Scell, wherein the Scell is configured with a plurality of bandwidth parts (e.g., configured with four BWPs), BWPs, the plurality of BWPs including a dormant BWP and one or more normal BWPs. If the indication indicates transitioning from dormancy behavior to non-dormancy behavior, the circuitry 680 determines a target BWP for performing non-dormancy behavior in accordance with at least one of: a priority order of the one or more normal BWPs, predefined or preconfigured BWP, a legacy BWP indicator field in the DCI signaling, a most recently active normal BWP, and the dormant BWP.

The circuitry 680 may implement more functionality than the above-mentioned obtaining of the dormancy indication and determining of the target BWP. Thus, the circuitry 680 is considered to include PDCCH-monitoring circuitry 685, which is configured to perform said obtaining and determining. The configuration may be provided by hardware adaption and/or by software.

Figure 8:
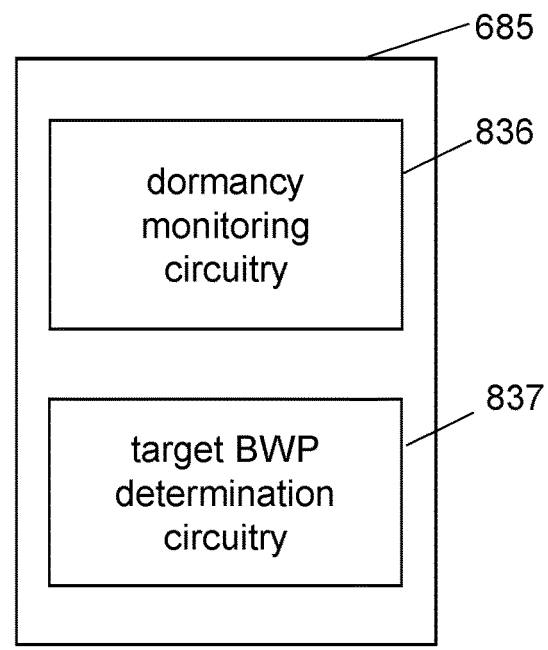
FIG. 8 is a block diagram illustrating an exemplary functional structure of a PDCCH monitoring circuitry that may be included in the exemplary user equipment of FIG. 6.

FIG. 8 shows an exemplary functional structure of the PDCCH-monitoring circuitry 685. In particular, the PDCCH-monitoring circuitry 685 may include a dormancy-monitoring circuitry 836 and a target BWP determination circuitry 837. The dormancy-monitoring circuitry 836 may obtain dormancy indications from the DCI/PDCCH and set the dormancy behavior in the cells accordingly. The dormancy-monitoring circuitry 836 may thus activate/deactivate PDCCH monitoring of the PDCCH-monitoring circuitry 685 in cells for which non-dormancy/dormancy behavior is indicated in the DCI. The BWP determination circuitry 837 is configured to determine respective target BWP(s) when a dormancy indication obtained by the dormancy-monitoring circuitry 836 indicates transition from dormancy behavior to non-dormancy behavior for one or more Scells.

It is noted that the PDCCH-monitoring circuitry 685 may implement more functionality as it may, for instance, determine resources for transmission/reception of data. The processing circuitry 680 may, for instance, further control the transceiver 670 to receive the PDCCH/DCI and to receive or transmit data on resources indicated in the PDCCH/DCI.

In particular, the circuitry 680 (in particular, the dormancy monitoring circuitry 836) may, in operation, if a dormancy indication indicates transitioning from dormancy behavior to non-dormancy behavior, transitions from dormancy behavior to non-dormancy behavior for the Scell, and perform the non-dormancy behavior in the determined target BWP. In particular, if an indication to switch the dormancy behavior to non-dormancy behavior is received for an Scell, the circuitry may control the transceiver 670 to monitor PDCCH in said Scell.

Figure 7:
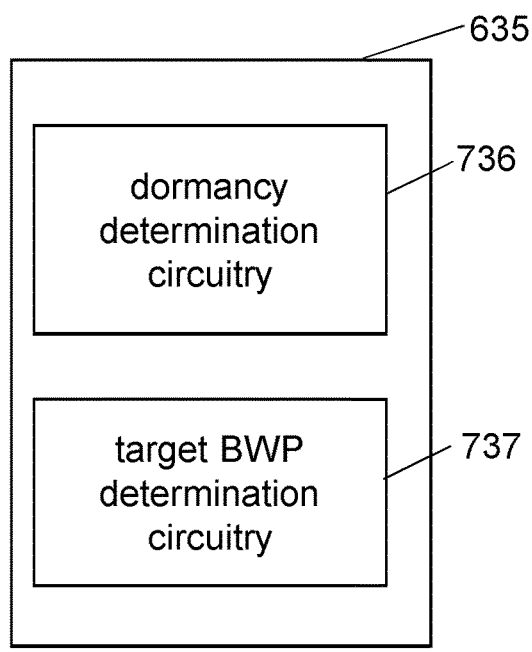
FIG. 7 is a block diagram illustrating an exemplary functional structure of a PDCCH generation circuitry that may be included in the exemplary scheduling node of FIG. 6.

According to another exemplary embodiment, a network node 610 is provided (left-hand side of FIG. 7), The network node comprises a transceiver 620 that, in operation, transmits downlink control information, DCI, signaling, that is addressed to a user equipment. The DCI signaling includes an indication that is related to dormancy behavior of a secondary cell (Scell) of the UE. Said Scell is configured with a plurality of bandwidth parts that includes a dormant BWP and one or more normal BWPs. The network further comprises a circuitry 630. If the indication indicates transitioning from dormancy behavior to non-dormancy behavior, said circuitry 630, in operation, determines a target BWP for performing non-dormancy behavior. The circuitry 630 may determine the target BWP in accordance with at least one of a priority order of the one or more normal BWPs, a predefined or preconfigured BWP, a legacy BWP indicator field in the DCI signaling, a most recently active normal BWP, and the dormant BWP.

The scheduling device 610 may further include, as a part of the circuitry 630, an allocation circuitry which performs scheduling of one UE or a plurality of UEs. As a result of the scheduling, the circuitry 630 may generate time-domain resource assignments, and the corresponding DCI signaling that indicates the resource assignments. The processing circuitry 630 may then control the transceiver 620 to transmit DCI, and to receive or transmit data on resources indicated in the generated PDCCH/DCI.

Figure 9:
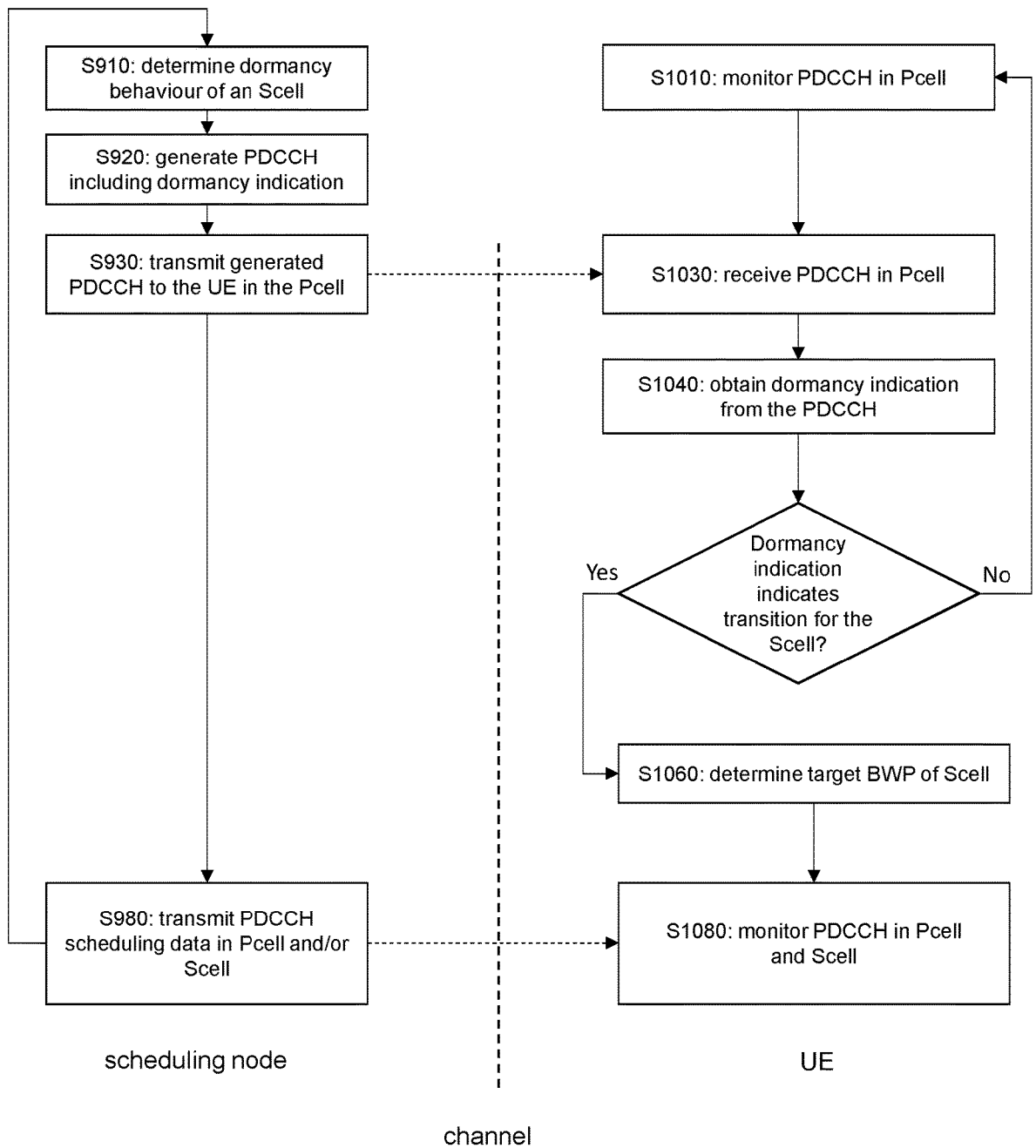
FIG. 9 is a flow chart illustrating exemplary steps performed by a network node as well as exemplary steps performed by a user equipment.

An exemplary functional structure of the PDCCH-generating circuitry 635 is shown in FIG. 9. In particular, the PDCCH-generating circuitry 685 may include a dormancy determination circuitry 736 and a target BWP determination circuitry 737. The PDCCH generating circuitry 635 may further perform the scheduling, e.g., collect measurements from one or more UEs and based thereon, based on the requests from the UEs and/or based on the availability of its resources, assigns to the respective UEs the resources. The PDCCH generating circuitry 635 may then generate DCI including resource assignment as well as associations in accordance with the scheduling result for the respective one or more UEs.

The dormancy determination circuitry 736 may determine the dormancy behavior that a UE should perform for one or more cells of its cells. The PDCCH-generating circuitry 685 may then include a corresponding dormancy indication indicating the result of dormancy determination performed by the dormancy determination circuitry 736 in a DCI that is addressed to the UE.

The target BWP determination circuitry 737 is configured to determine, when dormancy-determination circuitry 736 determines that a UE is to transition from dormancy behavior to non-dormancy behavior for one or more Scells, respective target BWP(s). It is noted that the target BWP determination circuitry 737 may determine the target BWP of a cell before the dormancy determination circuitry 736 determines the dormancy behavior for said cell. Actually, the dormancy determination circuitry 736 may determine the dormancy behavior for a cell or cell group taking into account the target BWP(s) of the cell or cell group.

As can be further seen in FIG. 6, the UE 660 and the scheduling nose 610 can form a communication system, i.e., can be capable of communicating over the channel 650.

In general, a UE that is indicated to transfer from dormancy-like to non-dormancy-like behavior for an activated Scell, may determine the target BWP based on one or a combination of a priority order of the one or more normal BWPs, a predefined or preconfigured BWP, a legacy BWP indicator field in the DCI signaling, a most recently active normal IMP, and the dormant BWP.

It is noted that, since a UE and a network node from a communication system and in order to use the activated BWP for which the UE will perform the non-dormancy behavior, UE and network node will have to know/determine the (same) target BWP. Thus, in general, the UE and network node may individually determine the target BWP using methods that at least yield the same result (for instance, target BWP determination circuitry 737 and target BWP determination circuitry 837 may work substantially similar or even be identical). In other words, the determination methods according to the present disclosure may in general be performed at the side of the UE and/or base station (network node). Alternatively, one of the two communication entities may determine the target BWP and transmit a corresponding indication to the other. For instance, the network node (e.g., the target BWP determination circuitry 737) may determine the target BWP for an Scell and transmit a corresponding indication to the UE, which then determines the target BWP for said Scell based on/in accordance with said indication (e.g., the BWP determination circuitry 837). In other words, when, in the present disclosure, the UE determines the target BWP using a particular method, the base station may determine the target BWP in the same or similar manner. Of course, in the case that the UE determines the target BWP based on a DCI and/or RRC indication received from the base station this may not apply. In this case, the base station may determine the target BWP and generate the corresponding indication taking into account other UEs, available resources, quality of service, requests from UEs, received channel state information, traffic loads, battery status of UEs, and the like.

In general, the target BWP may be a predefined or preconfigured BWP. Thus, in general, a UE that is indicated to transfer/switch to non-dormancy-like behavior for an active Scell may switch to a pre-defined/configured BWP to perform non-dormancy-like behavior and/or may select a pre-defined/configured BWP as the target BWP to support non-dormancy-like behavior.

In some embodiments, this pre-defined/configured BWP is a normal BWP, i.e., in some embodiments, the target BWP is the normal BWP or, if there is more than one normal BWP configured for a Scell, the target is one of the normal BWPs. For example, a predefined BWP (i.e., the target BWP) may be given by a standard. The standard may define directly the target BWP (e.g., the index of the target BWP). Alternatively, the standard may define an approach/method in which the BWP is determined. For instance, each BWP is associated with a respective index, and it may be defined that the BWP with the lowest index or with the highest index is the target BWP (lowest or highest among the indices of the configured BWPs).

The preconfigured BWP may be configured by Radio Resource Control, RRC, signaling. The RRC signaling is semi-static signaling. Alternatively, in order to increase configurability, the target BWP may be indicated or configured explicitly by a base station, for instance, via DCI.

Advantageously, in the present embodiments, the UE does not have to do the calculation in order to determine target BWPs, and the base station (gNB) may configure the target normal BWP by implementation.

However, the present disclosure is not limited thereto. In general, the predefined or preconfigured BWP may be the default BWP. In general, the default may be configured as a dormant or as a normal BWP. However, in some embodiments, the dormant BWP(s) can only be configured and selected from the BWPs other than the default BWP. Namely, the default BWP in the current NR specification can only be configured as a normal BWP rather than a dormant BWP. Thus, a UE indicated to transfer to non-dormancy-like behavior for an active Scell, may switch to the default BWP, which is the target BWP, to perform non-dormancy-like behavior.

Advantageously, the UE behavior is clearly defined with only a small specification impact, and there is no additional RRC parameter, thereby preventing additional overhead.

In general, the target BWP may be determined in accordance with (or based on) the legacy BWP indicator field in the DCI. In other words, a UE may determine the target BWP for a Scell by using the legacy BWP indicator field in the DCI carrying the dormancy behavior indication that indicates the transition to non-dormancy-like behavior for said Scell. Correspondingly, a basis station may determine a target BWP and set, when generating the DCI that indicates a transition to non-dormancy-like behavior, the legacy BWP indicator field in the DCI so that it indicates the determined target BWP. For instance, the target BWP may be determined based on the index indicated by the legacy BWP indicator field It is noted that the legacy BWP indicator field is a field in the DCI of a cell that is used by a base station to indicate a BWP of said cell to an UE. The legacy BWP indicator field may, for instance, be used to indicate the BWP in which the resources scheduled in said DCI (or following DCI of said cell are located. The legacy BWP indicator field may be used activate the indicated BWP and, consequently, be used to deactivate the currently active BWP. The legacy BWP indicator field may indicate or correspond to an index. More specifically, the legacy BWP indicator field is a field exist in DCI format 0_1 and 1_1 in NR for BWP switching operation, for instance as defined in the 3GPP TS 38.212.

It is noted that the legacy BWP indicator was not used in the NR Rel. 15 for dormancy indication or for indicating the target BWP when switching to non-dormancy behavior. It was used to change the active BWP in a serving cell that is scheduled with data. More specifically, in the NR Rel. 15, the legacy BWP indicator was a field included in DCI (format 0_1/1_1) of the Pcell or an Scell that also schedules data for said Pcell/Scell, where it was used to indicate the BWP, to be activated in said Pcell/Scell and in which the scheduled data are to be received/transmitted.

However, in some implementations of the present disclosure, for dormancy indication inside active time, for each active Scell configured to support dormancy behavior switching, the target BWP index determination for non-dormancy behavior is based on the BWP indictor for the Pcell. More specifically, a dormancy switching indication may be received in a DCI of a cell (this may be the Pcell or an Scell for which the UE performs non-dormancy-like behavior) that also schedules data and includes a legacy BWP indicator field. The legacy BWP indicator field may then be used to determine the target BWP of one or more Scells to which said dormancy switching indication relates.

However, the present disclosure is not limited thereto as the dormancy-transition indication may also be received in the DCI of a non-dormant Scell (which refers to an Scell for which the UE, when receiving the DCI, does not perform dormancy-like behavior). In this case, for instance, the legacy BWP indicator field in the DCI of the Scell may be used to determine the target BWP.

In general, each configured BWP of an Scell may be associated with or correspond to (e.g., in a one-to-one correspondence) an index. This association may be used to determine the target BWP using the index indicated by the legacy BWP indicator field.

For instance, in an exemplary implementation, it is always determined that the target BWP is that BWP of the configured BWPs that corresponds to the index indicated by the legacy BWP indicator field.

In another exemplary implementation, it may be determined that the target BWP is that BWP of the configured BWPs that corresponds to the index indicated by the legacy BWP indicator field, (only) if said index corresponds to a normal BWP, and, if said index corresponds to a dormant BWP, the target BWP may be determined according to a predetermined or predefined method. In other words, only if the index in the received legacy BWP indicator is not referring to the current dormant BWP of an Scell, then the UE determines the target BWP based on the legacy BWP indicator. If, on the other hand, the index in the received legacy BWP indicator is referring to the currently dormant BWP of the Scell, then the UE determines the target BWP based on, as described in other parts of this disclosure, a predefined or preconfigured BWP, most recently active normal BWP, a priority order of the configured BWPs, a priority order of the normal BWPs, and/or the dormant BWP.

Using the legacy BWP indicator field (or the index indicated by the legacy BWP indicator field to indicate the target BWP), has a small specification impact and prevents an increase of overhead when signaling the target BWP to the UE.

In general, the target BWP may be determined taking into account the activity of the configured normal and/or dormant BWPs. For instance, according to another embodiment, the target BWP is that normal BWP that has been active most recently among the normal BWPs that are configured for the respective cell of the UE. In other words, the UE (as well as the base station) may determine the target BWP as the most recently active BWP that is a normal BWP, namely, not a dormancy/dormant BWP. More specifically, a UE that is indicated to transfer to non-dormancy-like behavior for an active Scell, may determine the target BWP as the most recently active BWP where the UE performed non-dormancy-like behavior. Determining the target BWP based on the recent activity, offers the merit of a small specification impact. Furthermore, no additional signaling from the base station to the UE indicating the target BWP is required. This reduces the overhead and thereby increases the efficiency of the communication.

In some embodiments, it is determined that the target BWP is the dormant BWP. In other words, the UE (as well as the base station) determine the target BWP from the dormant BWP(s). If there is more than one dormant BWP configured for an Scell, the target BWP may be determined from all the dormant BWPs or, for instance, from the currently active dormant BWP, which is that BWP for which the UE performs dormancy-like behavior when the DCI with the dormancy switching indication for which the target BWP is to be determined is received. For instance, the target BWP may be the dormant BWP, in which case, the UE will not switch to a different BWP but perform the non-dormancy-like behavior in the currently active dormant BWP.

As mentioned above, in some embodiments, the target BWP is determined in accordance with (or based on) a priority order. For a UE indicated to transfer to non-dormancy-like behavior for an active Scell, the UE (e.g., the processing circuitry 680) determines the target BWP by calculating the priority order of BWPs, for instance, of the normal BWPs. Based on this priority order calculated by UE, the UE selects the target BWP to support non-dormancy-like behavior.

In general, such a priority order may be a priority of (all) the configured BWP, a priority order of (only) the normal BWP(s), or, for instance, a priority order of the configured BWPs except the currently active dormant BWP. Without prejudice thereto, for the sake of clarity, only priority orders of the normal BWPs are explicitly mentioned.

In general, a priority order of BWPs may be an ordering of BWPs, ranking of BWP, or a sequence of BWPs, in which each relevant BWP appears exactly once. In a priority order, each BWP may have or be associated with, explicitly or implicitly, a priority. A priority may be a value, and in the priority order the BWPs may be ordered according to the size of said priority value. A priority order may thus be constructed from a rule that assigns/associates each BWP with a (priority) value. Then, for each BWP, the corresponding priority order may be determined/calculated, by calculating the priority of each BWP, and ordering the BWPs according to the calculated priorities.

In general, if two BWPs are associated with the same priority, the two BWPs may be ordered arbitrarily, or additional one or more criteria may be defined to make the differentiation as to which BWP has the higher priority.

It is noted that, in order to determine the target BWP in accordance with a priority order, it may not be necessary to determine said priority order explicitly. For instance, only the priorities of the BWPs may be determined, and the BWP with the highest priority may be selected.

In general, it may be determined that the BWP with the highest priority (value) is the target BWP. However, in some embodiments, other criteria are taken into account, and the BWP with the highest priority that meets these criteria is selected as the target BWP.

For instance, in some implementations in which the target BWP is determined in accordance with a priority order, for each normal BWP, the priority of the normal BWP increases with increasing overlap in terms of bandwidth of the normal BWP and the dormant BWP. More specifically, a BWP has a higher priority (than another BWP) if it has more overlapping bandwidth (than said other BWP) with the currently active dormant BWP. Thus, the target BWP is that normal BWP that has the highest overlap (among the normal BWPs), in terms of bandwidth, with the currently active dormant BWP.

For instance, if BWP#1 has 10 MHz overlapping bandwidth with the currently dormant BWP, and BWP#2 has 5 MHz overlapping bandwidth with currently dormant BWP, the UE may, for instance, determine that the priority of BWP#1 is 10, and the priority of BWP#2 is 5. The UE thus chooses BWP#1 as the target BWP to conduct non-dormancy like behavior. In general, a UE may thus determine/calculate, for each normal BWP, the overlap of the normal BWP with the currently active dormant BWP, and select, as the target BWP, that normal BWP for which it has calculated the highest overlap.

Advantageously, the present implementation enables the gNB to make use of previous CSI reports for the currently active dormant BWP, received from the UE (when the UE performed the dormancy-like behavior in said BWP).

In other implementations in which the target BWP is determined in accordance with a priority order, for each normal BWP, a priority of the normal BWP increases with decreasing difference between a central frequency of the normal BWP and a central frequency of the dormant BWP. More specifically, a BWP has higher priority if the central frequency of said BWP is closer with the central frequency of the currently dormant BWP. In general, a UE may thus determine/calculate, for each normal BWP, the difference of the central frequency of the normal BWP to the central frequency of currently active dormant BWP, and select, as the target BWP, that normal BWP for which it has calculated the smallest difference.

Advantageously, the present implementation enables the gNB to make use of previous CSI reports for the currently active dormant BWP, received from the UE (when the UE performed the dormancy-like behavior in said BWP).

According to another embodiment, a method for a UE is provided. The method comprises a step of receiving DCI signaling and a step of obtaining, from the DCI signaling, an indication that is related to dormancy behavior of an Scell. The Scell is configured with a plurality of BWPs, and the plurality of BWPs includes a dormant BWP and one or more normal BWPs. If the indication indicates transitioning from dormancy behavior to non-dormancy behavior, the method further comprises a step of determining a target BWP for performing non-dormancy behavior. The target BWP is determined in accordance with at least one of a priority order of the one or more normal BWPs, a predefined or preconfigured BWP, a legacy BWP indicator field in the DCI signaling, a most recently active normal BWP, and the dormant BWP.

According to another embodiment, a method for a network node is provided. The method comprises a step of transmitting DCI signaling. The DCI signaling is addressed to a UE and includes an indication that is related to dormancy behavior of an Scell of the UE. The Scell is configured with a plurality of BWPs and includes a dormant BWP and one or more normal BWPs. If the indication indicates transitioning from dormancy behavior to non-dormancy behavior, the method further comprises a step of determining a target BWP for performing non-dormancy behavior in accordance with at least one of a priority order of the one or more normal BWPs, a predefined or preconfigured BWP, a legacy BWP indicator field in the DCI signaling, a most recently active normal BWP, and the dormant BWP.

The left-hand and right-hand side of FIG. 9 illustrate an exemplary method according to the present disclosure for a base station and a UE, respectively.

In step S910, the base station determines S910 the dormancy behavior of an Scell of an UE. This determination may take into account other UEs, available resources, quality of service, requests from UEs, received channel state information, traffic loads, battery status of UEs, and the like. In case that the UE currently performs dormancy-like behavior for the Scell, this determination may further take into account the available target BWPs (e.g., in implementations, where the base station can select the target BWP and indicate the selected target BWP to the UE in DCI together with the dormancy switching indication) or the BWP that will be the target BWP (e.g., in implementations, where the base station cannot indicate the target BWP to the UE in DCI together with the dormancy switching indication).

In other words, if the UE currently performs dormancy-like behavior for the Scell, the base station determines whether the UE should i) continue performing dormancy behavior for the Scell or should ii) switch to non-dormancy behavior in said Scell. The base station may also determine the target BWP as part of this step. If, on the other hand, the UE currently performs non-dormancy-like behavior for the Scell, the base station determines whether the UE should i) continue performing non-dormancy-like behavior for the Scell or should ii) switch to dormancy behavior in said Scell. In yet other words, the base station determines, whether or not a switch of the dormancy behavior of the Scell is to be indicated to the UE.

It is noted that, if the more than one cell of the UE supports dormancy-like behavior, the dormancy behavior of more than cells may be determined in this steps. In particular, advantageously, this determination is performed jointly for more than one cell.

As indicated in FIG. 9, the base station may reassess, the dormancy behavior of Scells. For instance, the base station may (re-)determine regularly/periodically whether a switch of dormancy behavior is to be indicated to the UE. Alternatively or in addition, the (re)determination of the dormancy behavior of an Scell may be triggered by some event, such as a request of the UE to transmit data or an increase/decrease of traffic related to the UE.

In particular, in step S920, the base station generates S920 a PDCCH/DCI that includes a dormancy indication that indicates switching or maintaining the dormancy behavior of the Scell in accordance with the determination of the dormancy behavior in step S910. This DCI may include further control information, and may or may not schedule data. The DCI may be generated for the PDCCH of the Pcell of the UE or another Scell of the UE for which the UE currently does not perform dormancy-like behavior.

In step S930, the base station transmits S930 the DCI generated in step S920 to the UE. As just mentioned the DCI may be transmitted in the Scell or a Pcell.

In step S980, the base station transmits data DCI in the PDCCH of the Pcell or an Scell. It is noted that this step may be omitted, if no data is to be transmitted to/received to the UE. In case that an Scell has been switched from dormancy-like behavior to non-dormancy-like behavior, the UE now also monitors the PDCCH of said Scell and, thus, the base station may now also transmit DCI scheduling data in the PDCCH of said Scell.

In step S1010, the UE monitors S1010 the PDCCH of the Pcell. It is noted that on the right-hand side of FIG. 9, it is assumed that the UE is currently performing dormancy-like behavior for the Scell(s).

In step S1030, the UE receives, in the PDCCH of the Pcell, while monitoring said PDCCH of the Pcell, a DCI that includes a dormancy indication that is related to the Scell(s).

In step S1040, the UE obtains S1040 the dormancy indication from the DCI of the PDCCH of the Pcell. The UE may then determine whether or not the dormancy indication indicates a transition from dormancy-like to non-dormancy-like behavior for one or more cells. If no transition is indicated by the dormancy indication the UE continues monitoring only the PDCCH of the Pcell. If on the other hand the dormancy indication indicates a switch to non-dormancy like behavior the UE determines S1060, for each Scell to which the dormancy indication relates, the target BWP to perform the non-dormancy-like behavior as described in other parts of the present disclosure.

In the case that there are one or more Scells for which the UE currently performs non-dormancy-like behavior, the UE may also determine, for each of these one or more cells, whether or not the dormancy indication indicates a transition from non-dormancy-like to dormancy-like behavior. In case of such an indication, the dormant BWP(s) of these Scell(s) become the active BWP(s), and the UE start performing dormancy-like behavior for these Scell(s).

In step S1080, the UE monitors the PDCCH in the Pcell and the Scell(s). More specifically, for each Scell, the UE monitors the PDCCH in the target BWP determined in step S1060.

It is noted that all embodiments and implementations described in the present disclosure apply not only for within active time (C-DRX On Duration) but also to outside active time, where the non-dormancy indication is contained in the DCI formant 3_0, which is known as WUS (Wake-up Signal) or PoSS (Power Saving Signal/Channel).

In other words, in some of the above embodiments, the dormancy indication is carried by a DCI in the active time. For example, DCI formats which also schedule data may be used for that purpose. However, the present disclosure is not limited thereto and the dormancy indication may also be included into a DO which does not schedule data. For example, the dormancy indication may be included into DCI which is a wake up signal from some power-saving operation, e.g., from the above-mentioned discontinuous reception (DRX). DRX is a cycle of ON periods in which the UE monitors a PDCCH for scheduling assignments and OFF periods (for power saving purposes) in which the UE does not monitor a PDCCH for scheduling assignments.

For example, for OnDuration, where to wake-up from DRX OFF, the UE may determine, as described above, the target BWP in accordance with any one or more of a priority order of the one or more normal BWPs, a predefined or preconfigured BWP, a legacy BWP indicator field in the DCI signaling, and the dormant BWP. While the present disclosure is not limited to the above determination examples, and, in general, the target BWP may also be determined as the most recently active normal BWP, such determination may be less effective if the DRX OFF period is long.

For the other cases, i.e., non-DRX operation or the transition within Active time, the target BWP may be determined as the most recently active normal BWP. In this scenario (active time), determination of the target BWP as the most recently active normal BWP may provide an efficient means to start non-dormancy behavior, e.g., it may reduce the probability that active BWP change will need to be performed soon.

As already described above, for the dormancy indication in the active time, any of the above described BWP determination approaches may be used alone or in combination.

According to another implementation a non-transitory computer-readable recording medium is provided. The recording medium stores a program which, when executed by one or more processors, causes the one or more processors to carry out the steps of a method according to the present disclosure.

Embodiments, e.g., of the UE 660 and the base station 610, and functions described herein, e.g., with reference to the UE 660 and the base station 610, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

According to a first embodiment, an apparatus (e.g., a user equipment, UE) is provided. The apparatus comprises a transceiver that, in operation, receives downlink control information, DCI, signaling. The apparatus further comprises a circuitry that, in operation, obtains, from the DCI signaling, an indication that is related to dormancy behavior of a secondary cell, Scell, wherein the Scell is configured with a plurality of bandwidth parts, BWPs, the plurality of BWPs including a dormant BWP and one or more normal BWPs; and, if the indication indicates transitioning from dormancy behavior to non-dormancy behavior, determines a target BWP for performing non-dormancy behavior. The determination of the target BWP is performed, in particular, in accordance with at least one of: a priority order of the one or more normal BWPs, a predefined or preconfigured BWP, a legacy BWP indicator field in the DCI signaling, a most recently active normal BWP, and the dormant BWP.

According to a second embodiment, in the apparatus of the first embodiment, the predefined or preconfigured BWP is: configured by Radio Resource Control, RRC, signaling, a BWP with a lowest, a BWP with a highest index, and/or indicated explicitly by a base station.

According to a third embodiment, in the apparatus of the first embodiment or the second embodiment, the predefined or preconfigured BWP is a default BWP which is configured as a normal BWP.

According to a fourth embodiment, in the apparatus of the first embodiment, the circuitry (in operation) determines the target BWP based on an index indicated by the legacy BWP indicator field.

According to a fifth embodiment, in the apparatus of the fourth embodiment, if the index corresponds to an index of a normal BWP of the one or more normal BWPs, the circuitry (in operation) determines that the target BWP is said normal BWP; and, if the index corresponds to an index of the dormant BWP the circuitry determines: that the target BWP is the dormant BWP; or the target BWP according to a predetermined or predefined method.

According to a sixth embodiment, in the apparatus of the first embodiment, the circuitry (in operation) determines that the target BWP is that normal BWP that has been active most recently among the one or more normal BWPs.

According to a seventh embodiment, in the apparatus of the first embodiment, the circuitry (in operation) determines that the target BWP is the dormant BWP.

According to an eighth embodiment, in the apparatus of the first embodiment, in the priority order, for each normal BWP, a priority of the normal BWP increases with increasing overlap in terms of bandwidth of the normal BWP and the dormant BWP.

According to an ninth embodiment, in the apparatus of the first embodiment, in the priority order, for each normal BWP, a priority of the normal BWP increases with decreasing difference between a central frequency of the normal BWP and a central frequency of the dormant BWP.

According to a tenth embodiment, in the apparatus of any of the first embodiment to ninth embodiment, the circuitry, in operation, if the indication indicates transitioning from dormancy behavior to non-dormancy behavior: transitions from dormancy behavior to non-dormancy behavior for the Scell, and performs the non-dormancy behavior in the determined target BWP.

According to an eleventh embodiment, a method is provided (e.g., a method for a user equipment, UE). The method comprises a step of receiving downlink control information, DCI, signaling; obtaining, from the DCI signaling, an indication that is related to dormancy behavior of a secondary cell, Scell, wherein the Scell is configured with a plurality of bandwidth parts, BWPs, the plurality of BWPs including a dormant BWP and one or more normal BWPs. The method further comprises a step which, if the indication indicates transitioning from dormancy behavior to non-dormancy behavior, determines a target BWP for performing non-dormancy behavior. In particular, the determination is performed in accordance with at least one of: a priority order of the one or more normal BWPs, a predefined or preconfigured BWP, a legacy BWP indicator field in the DCI signaling, a most recently active normal BWP, and the dormant BWP.

According to a twelfth embodiment, a network node is provided. The network node comprises a transceiver that, in operation, transmits downlink control information, DCI, signaling, that is addressed to a user equipment, UE, wherein the DCI signaling includes an indication that is related to dormancy behavior of a secondary cell, Scell, of the UE, wherein the Scell is configured with a plurality of bandwidth parts, BWPs, the plurality of BWPs including a dormant BWP and one or more normal BWPs. The network node comprises a circuitry that, in operation, if the indication indicates transitioning from dormancy behavior to non-dormancy behavior, determines a target BWP for performing non-dormancy behavior in accordance with at least one of: a priority order of the one or more normal BWPs, a predefined or preconfigured BWP, a legacy BWP indicator field in the DCI signaling, a most recently active normal BWP, and the dormant BWP.

According to a thirteenth embodiment, a method is provided for a network node. The method comprises the step of transmitting downlink control information, DCI, signaling, that is addressed to a user equipment, UE, wherein the DCI signaling includes an indication that is related to dormancy behavior of a secondary cell, Scell, of the UE, wherein the Scell is configured with a plurality of bandwidth parts, BWPs, the plurality of BWPs including a dormant BWP and one or more normal BWPs. The method comprises a step which, if the indication indicates transitioning from dormancy behavior to non-dormancy behavior, determines a target BWP for performing non-dormancy behavior in accordance with at least one of a priority order of the one or more normal BWPs, a predefined or preconfigured BWP, a legacy BWP indicator field in the DCI signaling, a most recently active normal BWP, and the dormant BWP.

According to a fourteenth embodiment, a non-transitory computer-readable recording medium is provided, the medium storing a program which, when executed by one or more processors, causes the one or more processors to carry out the steps of the method according to any of the above-mentioned above mentioned eleventh or thirteenth embodiment.

It is notes that the steps performed by the above mentioned circuitries in operation also constitute steps of the respective corresponding methods. These may also be implemented in a computer program which may be stored on a non-transitory computer-readable recording medium.

The disclosure relates to a communication device, a base station and respective methods for a communication device and a base station. More specifically, the base station transmits and the communication device receives Downlink control information (DCI) signaling. The DCI signaling includes an indication that is related to the dormancy behavior of a secondary cell (Scell). The Scell is configured with a plurality of bandwidth parts (BWPs) and the plurality of BWPs includes a dormant BWP and one or more normal BWPs. If the indication indicates transitioning from dormancy behavior to non-dormancy behavior, a target BWP for performing non-dormancy behavior is determined. The determination of the target BWP is performed, in particular, in accordance with at least one of: a priority order of the one or more normal BWPs, a predefined or preconfigured BWP, a legacy BWP indicator field in the DCI signaling, a most recently active normal BWP, and the dormant BWP.

The invention claimed is:

1. A communication apparatus comprising:
 a transceiver that, in operation, receives downlink control information (DCI) signaling; and
 a circuitry that, in operation:
  obtains, from the DCI signaling, an indication that is related to a dormancy behavior of a secondary cell (Scell); and
  if the indication indicates a non-dormancy behavior, determines a target BWP for performing the non-dormancy behavior in accordance with a preconfigured BWP,
 wherein:
  if the DCI signaling is a first DCI signaling, the indication is related to the dormancy behavior within an active time, and
  if the DCI signaling is a second DCI signaling, the indication is related to the dormancy behavior outside the active time.

2. The communication apparatus according to claim 1, wherein
 the preconfigured BWP is:
  configured by Radio Resource Control (RRC) signaling,
  a BWP with a lowest index,
  a BWP with a highest index, or
  indicated explicitly by a base station.

3. The communication apparatus according to claim 1, wherein the preconfigured BWP is a default BWP which is configured as a normal BWP.

4. The communication apparatus according to claim 1, wherein
 the circuitry, in operation, if the indication indicates transitioning from the dormancy behavior to the non-dormancy behavior:
  transitions from the dormancy behavior to the non-dormancy behavior for the Scell, and
  performs the non-dormancy behavior in the determined target BWP.

5. The communication apparatus according to claim 1, wherein the circuitry, in operation, determines the target BWP in accordance with at least one of:
 a priority order of one or more normal BWPs,
 a legacy BWP indicator field in the DCI signaling,
 a most recently active normal BWP, or
 a dormant BWP.

6. The communication apparatus according to claim 5, wherein the circuitry determines the target BWP based on an index indicated by the legacy BWP indicator field.

7. The communication apparatus according to claim 6, wherein,
if the index corresponds to an index of a normal BWP of the one or more normal BWPs, the circuitry determines that the target BWP is said normal BWP; and
if the index corresponds to an index of the dormant BWP the circuitry determines:
that the target BWP is the dormant BWP; or
the target BWP according to a predetermined or pre-defined method.

8. The communication apparatus according to claim 5, wherein the circuitry determines that the target BWP is that normal BWP that has been active most recently among the one or more normal BWPs.

9. The communication apparatus according to claim 5, wherein the circuitry determines that the target BWP is the dormant BWP.

10. The communication apparatus according to claim 5, wherein, in the priority order, for each normal BWP, a priority of the normal BWP increases with an increasing overlap in bandwidth of the normal BWP and the dormant BWP.

11. The communication apparatus according to claim 5, wherein, in the priority order, for each normal BWP, a priority of the normal BWP increases with decreasing difference between a central frequency of the normal BWP and a central frequency of the dormant BWP.

12. A method for a communication apparatus comprising
receiving downlink control information (DCI) signaling;
obtaining, from the DCI signaling, an indication that is related to a dormancy behavior of a secondary cell (Scell); and
if the indication indicates a non-dormancy behavior, determining a target BWP for performing the non-dormancy behavior in accordance with a preconfigured BWP,
wherein:
if the DCI signaling is a first DCI signaling, the indication is related to the dormancy behavior within an active time, and
if the DCI signaling is a second DCI signaling, the indication is related to the dormancy behavior outside the active time.

13. A non-transitory computer-readable recording medium storing a program which, when executed by one or more processors, causes the one or more processors to carry out the steps of the method according to claim 12.

14. A network node, comprising:
a transceiver that, in operation, transmits downlink control information (DCI) signaling that is addressed to a user equipment (UE), wherein
the DCI signaling includes an indication that is related to a dormancy behavior of a secondary cell (Scell) of the UE; and
a circuitry that, in operation, if the indication indicates a non-dormancy behavior, determines a target BWP for performing the non-dormancy behavior in accordance with a preconfigured BWP,
wherein:
if the DCI signaling is a first DCI signaling, the indication is related to the dormancy behavior within an active time, and
if the DCI signaling is a second DCI signaling, the indication is related to the dormancy behavior outside the active time.

15. A method for a network node, comprising:
transmitting downlink control information (DCI) signaling that is addressed to a user equipment (UE), wherein
the DCI signaling includes an indication that is related to a dormancy behavior of a secondary cell (Scell) of the UE; and
if the indication indicates a non-dormancy behavior, determining a target BWP for performing the non-dormancy behavior in accordance with a preconfigured BWP,
wherein:
if the DCI signaling is a first DCI signaling, the indication is related to the dormancy behavior within an active time, and
if the DCI signaling is a second DCI signaling, the indication is related to the dormancy behavior outside the active time.

* * * * *